United States Patent
Fujii

(10) Patent No.: US 8,654,679 B2
(45) Date of Patent: Feb. 18, 2014

(54) COMMUNICATION APPARATUS, CONTROL METHOD THEREOF, AND COMPUTER PROGRAM

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 12/600,172

(22) PCT Filed: Jul. 17, 2008

(86) PCT No.: PCT/JP2008/063324
§ 371 (c)(1),
(2), (4) Date: Nov. 13, 2009

(87) PCT Pub. No.: WO2009/017036
PCT Pub. Date: Feb. 5, 2009

(65) Prior Publication Data
US 2010/0215025 A1    Aug. 26, 2010

(30) Foreign Application Priority Data
Aug. 1, 2007    (JP) ................................ 2007-200907

(51) Int. Cl.
*H04L 12/28*    (2006.01)
(52) U.S. Cl.
USPC ........................................................ 370/255
(58) Field of Classification Search
USPC .................... 370/230, 254, 255; 709/227–299
See application file for complete search history.

(56) References Cited

U.S. PATENT DOCUMENTS

| | | | |
|---|---|---|---|
| 6,947,156 B1 | 9/2005 | Jeyachandran et al. | |
| 7,403,221 B2 | 7/2008 | Yamazaki et al. | |
| 7,502,931 B2* | 3/2009 | Theimer | 713/171 |
| 2003/0091015 A1 | 5/2003 | Gassho et al. | |
| 2003/0097473 A1* | 5/2003 | Saitoh | 709/245 |
| 2005/0030945 A1* | 2/2005 | Sarikaya et al. | 370/389 |
| 2006/0045267 A1* | 3/2006 | Moore et al. | 380/247 |

FOREIGN PATENT DOCUMENTS

| | | |
|---|---|---|
| CN | 1325578 A | 12/2001 |
| JP | 11-8625 | 1/1999 |
| JP | 2003-143156 A | 5/2003 |
| JP | 2003-338821 | 11/2003 |
| JP | 2007-151195 A | 6/2007 |

OTHER PUBLICATIONS

U.S. Appl. No. 12/519,511, filed Jun. 16, 2009. Applicants: Kenichi Fujii, et al.
Chinese Office Action dated Feb. 16, 2012 issued in corresponding Chinese Patent Application No. 200880023021.8.

* cited by examiner

*Primary Examiner* — Dang Ton
*Assistant Examiner* — Kevin Lee
(74) *Attorney, Agent, or Firm* — Fitzpatrick, Cella, Harper & Scinto

(57) ABSTRACT

A communication apparatus for performing a communication parameter configuration process as one of a communication parameter providing apparatus and a communication parameter receiving apparatus, comprises: a first reception unit adapted to receive a communication parameter from another communication apparatus; and an enabling unit adapted to enable a communication parameter providing function for providing a communication parameter to another communication apparatus, after the communication parameter is received.

8 Claims, 15 Drawing Sheets

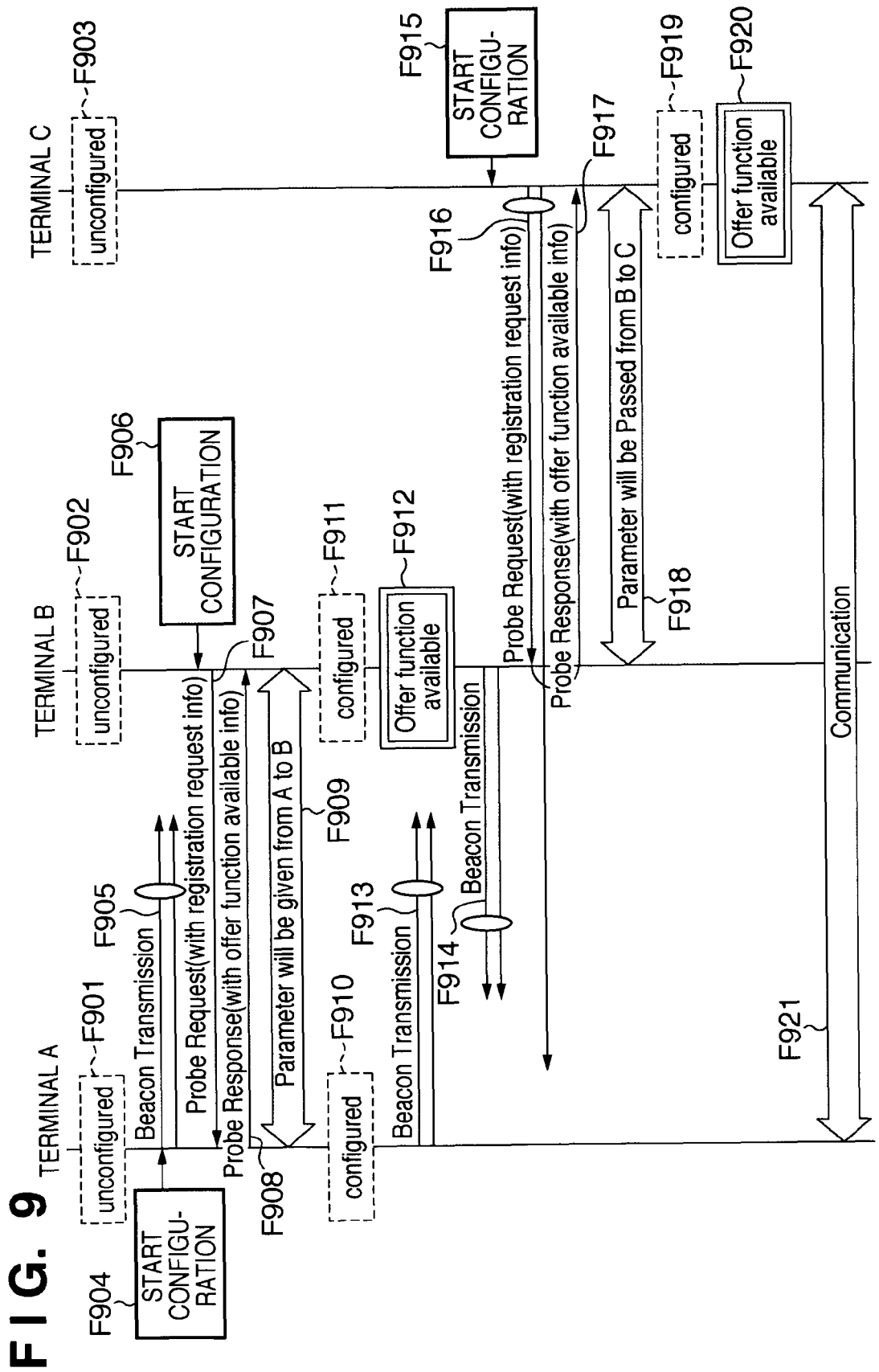

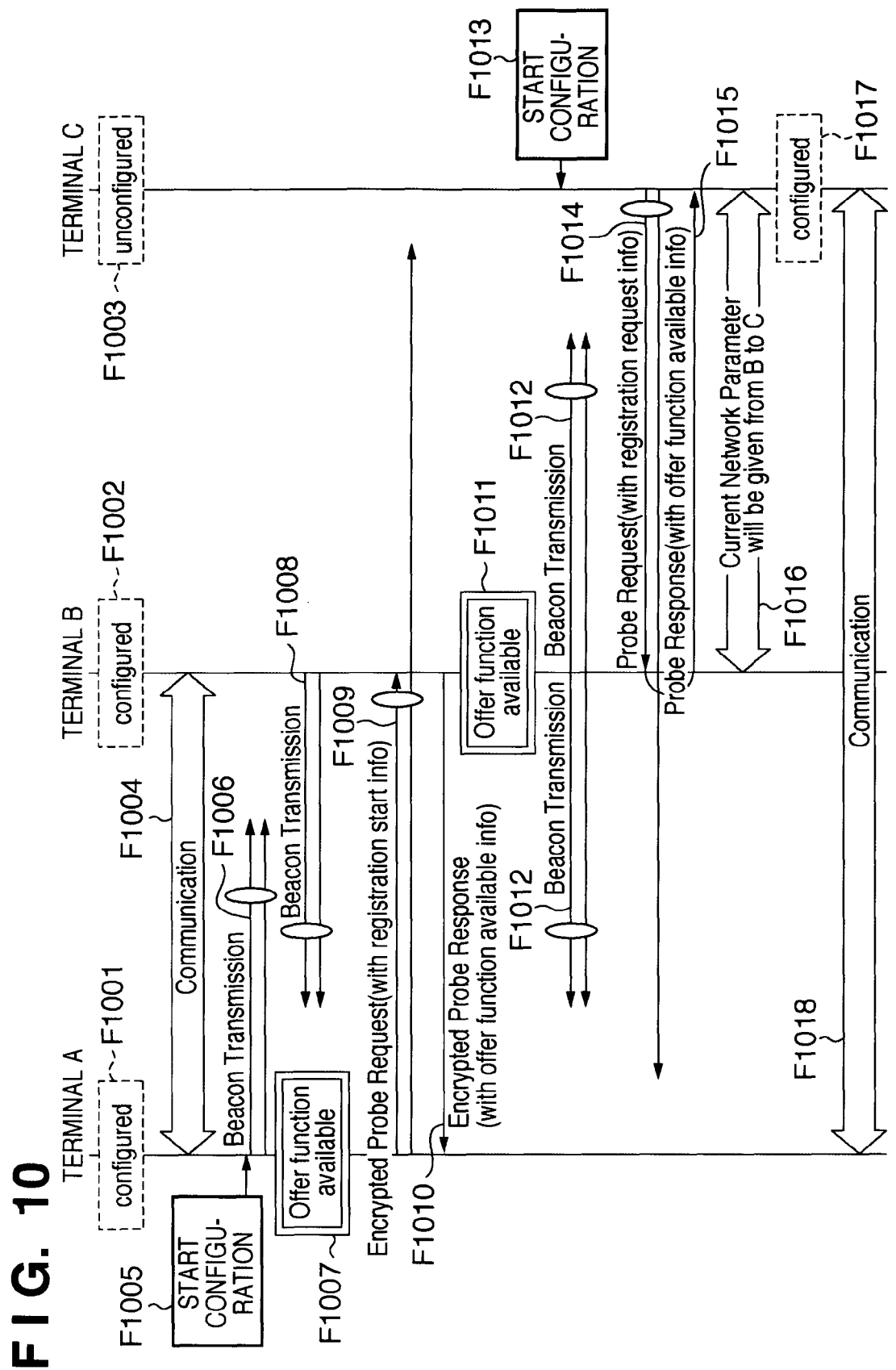

US 8,654,679 B2

COMMUNICATION APPARATUS, CONTROL METHOD THEREOF, AND COMPUTER PROGRAM

TECHNICAL FIELD

The present invention relates to a communication apparatus, a control method thereof and a computer program, and in particular to a technique for configuring communication parameters.

BACKGROUND ART

With wireless communication typified by a wireless LAN compliant with the IEEE 802.11 standard series, there are numerous setting items that must be configured prior to use. As for the setting items, there are, for example, communication parameters required for wireless communication such as an SSID constituting a network identifier, an encryption method, an encryption key, an authentication method and an authentication key, which are extremely complicated for users to configure manually.

In view of this, auto-configuration methods for easily configuring communication parameters in wireless devices have been conceived by various manufactures. These auto-configuration methods involve communication parameters being provided from one device to another device using messages and predetermined procedures between connected devices, and communication parameter configuration being performed automatically.

Respective manufactures often employ their own communication parameter auto-configuration method. Accordingly, communication parameters cannot be configured using an auto-configuration method between devices not compatible with a common communication parameter auto-configuration method, given differences in the procedures for configuring communication parameters and differences in the decipherable messages. On the other hand, communication parameters can be easily configured between devices compatible with a common communication parameter auto-configuration method, using that auto-configuration method.

Disclosed in Japanese Patent Application Laid-Open No. 2003-338821 is exemplary communication parameter auto-configuration.

This communication parameter auto-configuration method requires roles of a providing apparatus that provides a communication parameter to another wireless device, and a receiving apparatus that receives and configures in the apparatus the communication parameter provided by the providing apparatus.

Therefore, in the case where a wireless device receives a communication parameter provided using auto-configuration, the wireless device must search for a device providing communication parameters.

However, the wireless device is unable to easily search for a communication parameter providing device, since providing apparatuses do not always respond to a signal for searching for a providing apparatus.

For example, with an IBSS/ad-hoc network compliant with IEEE 802.11 standards, the station that last transmitted a beacon is the stipulated as the station to respond to a probe request constituting a search request signal. Therefore, even when a probe request for searching for a providing apparatus is transmitted, a device other than a providing apparatus may respond, making it difficult to settle on a communication parameter providing apparatus.

DISCLOSURE OF INVENTION

In view of the above, an object of the present invention is to be able to easily and quickly settle on a providing apparatus that provides communication parameters.

According to one aspect of the present invention, a communication apparatus for performing a communication parameter configuration process as one of a communication parameter providing apparatus and a communication parameter receiving apparatus, comprises:

a first reception unit adapted to receive a communication parameter from another communication apparatus; and an enabling unit adapted to enable a communication parameter providing function for providing a communication parameter to another communication apparatus, after the communication parameter is received.

According to another aspect of the present invention, a control method of a communication apparatus for performing a communication parameter configuration process as one of a communication parameter providing apparatus and a communication parameter receiving apparatus, comprises the steps of:

receiving a communication parameter from another communication apparatus; and enabling a communication parameter providing function for providing a communication parameter to another communication apparatus, after the communication parameter is received.

Further features of the present invention will become apparent from the following description of exemplary embodiments (with reference to the attached drawings).

BRIEF DESCRIPTION OF DRAWINGS

FIG. 9 shows a sequence in the case where configuration of a communication parameter in a terminal C is performed, after the communication parameter auto-configuration process is executed between a terminal A and the terminal B.

FIG. 10 shows a sequence in the case where a configuration operation is performed in the terminal A, after the communication parameter auto-configuration process is executed between the terminal A and the terminal B.

BEST MODE FOR CARRYING OUT THE INVENTION

First Embodiment

A wireless communication apparatus according to the present invention will now be described in detail with reference to the drawings. Hereinafter, an example using a wireless LAN system compliant with the IEEE 802.11 series will be described, although the mode of communication is not necessarily limited to a wireless LAN compliant with IEEE 802.11.

A hardware configuration in a preferred example of the present embodiment will be described.

Figure 1:
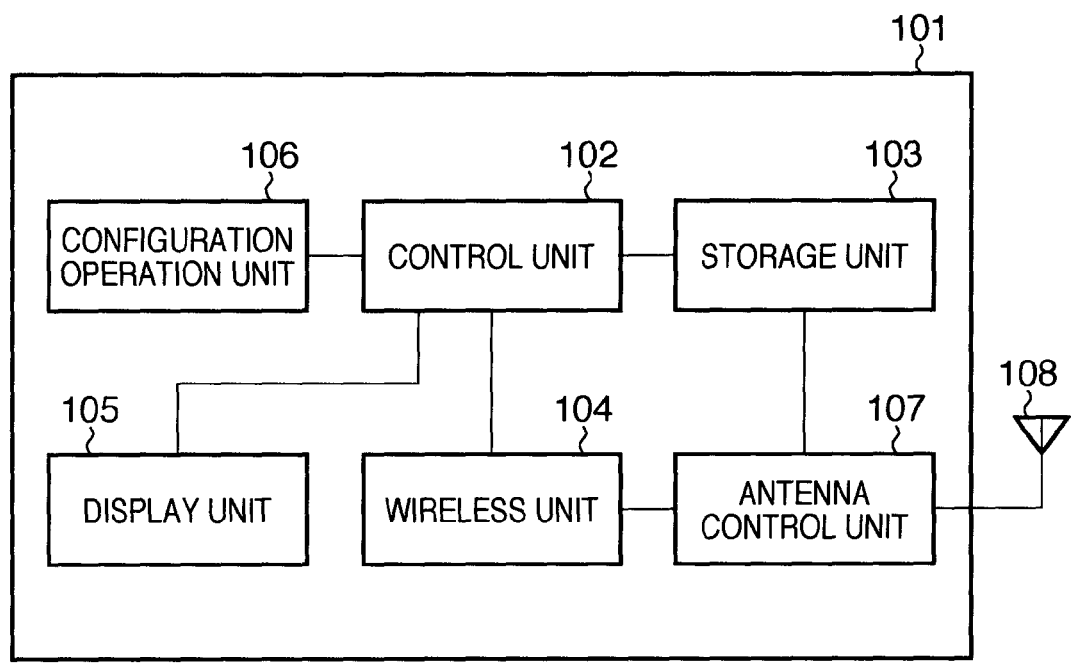
FIG. 1 is a block configuration diagram of a terminal in an embodiment of the present invention.

FIG. 1 is a block diagram showing an exemplary configuration of terminals (described below) according to an embodiment to which the present invention can be applied.

Reference numeral 101 denotes the entire terminal. Reference numeral 102 denotes a control unit that controls the entire terminal by executing a control program stored in a storage unit 103. The control unit 102 also controls the configuration of communication parameters used in communication with another terminal.

Reference numeral 103 denotes a storage unit that stores the control program executed by the control unit 102, and various types of information such as communication parameters. Various operations (described below) are performed as a result of the control unit 102 executing the control program stored in the storage unit 103.

Reference numeral 104 denotes a wireless unit for performing wireless communication. Reference numeral 105 denotes a display unit that performs various displays, and has a function capable of visually recognizable information output such as LCD or LED, or sound output via speakers or the like. The display unit 105 is capable of displaying configuration states and configuration results, as well as performing error display and the like.

Reference numeral 106 denotes a configuration operation unit used by the user for performing various operations concerning the communication parameter auto-configuration process. The user is able to press a button for instructing the start of the communication parameter auto-configuration process, enter a password for performing an authentication process with an opposing terminal, and the like, using the configuration operation unit 106. The configuration operation unit 106 may be a physical button, or may be a virtual button realized by a user interface using software. The control unit 102 starts a communication parameter configuration operation (described below) by detecting an operation of the configuration operation unit 106 by the user.

Reference numeral 107 denotes an antenna control unit, and 108 denotes an antenna.

Figure 2:
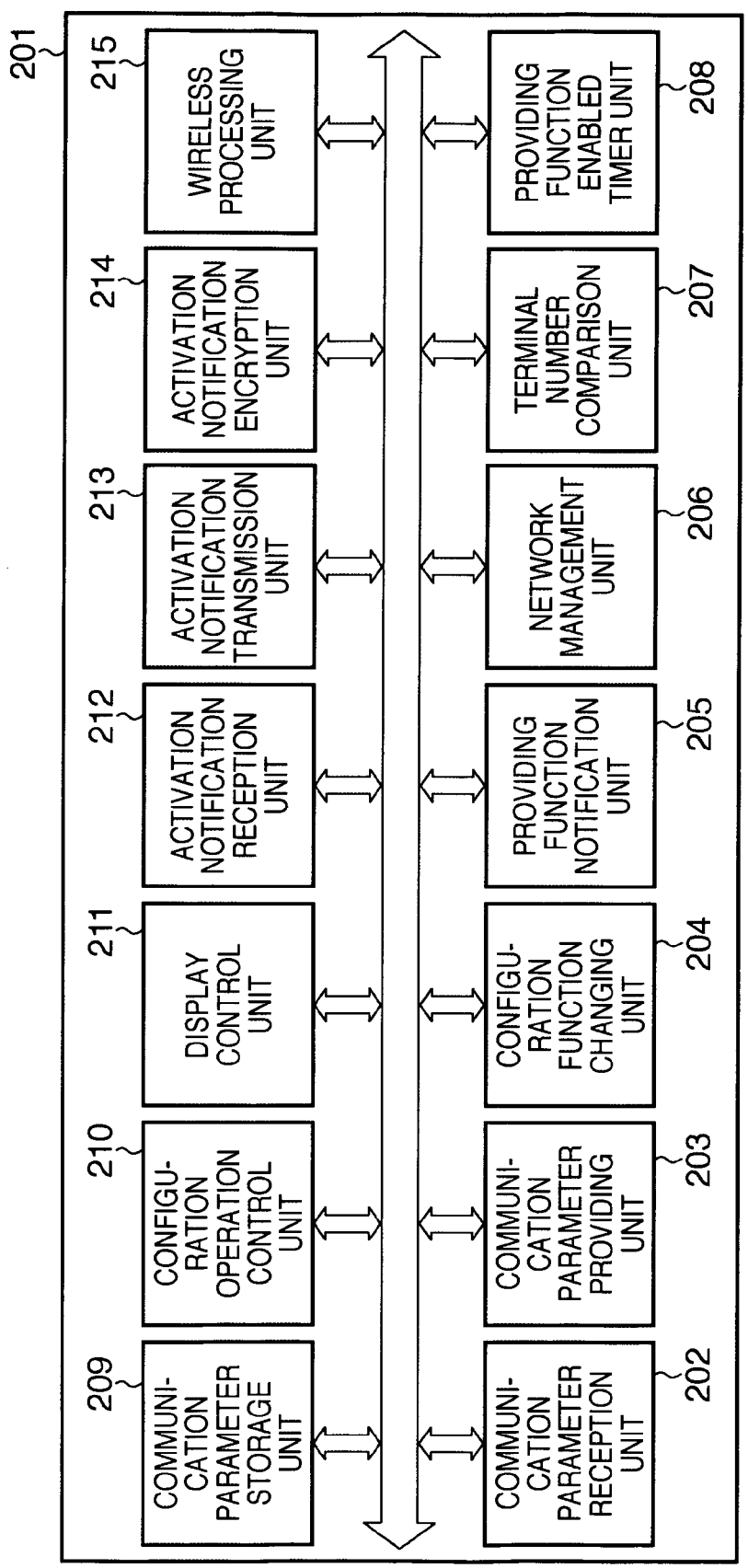
FIG. 2 shows software functional blocks of the terminal in the embodiment of the present invention.

FIG. 2 is a block diagram representing an exemplary functional block configuration of software executed by the terminals (described below), according to an embodiment to which the present invention can be applied. A control program for controlling this software mechanism is stored in the storage unit 103, and the operation of the software function is performed as a result of the control unit 102 executing this control program.

Reference numeral 201 denotes the entire terminal. Reference numeral 202 denotes a communication parameter reception unit that receives communication parameters from a providing apparatus in the communication parameter auto-configuration process. Reference numeral 203 denotes a communication parameter providing unit that provides communication parameters to a receiving apparatus in the communication parameter auto-configuration process. A communication parameter auto-configuration functional block is formed by combining 202 and 203. In the present embodiment, communication parameters required for performing wireless communication, such as an SSID constituting a network identifier, an encryption method, an encryption key, an authentication method and an authentication keys, are automatically configured.

Reference numeral 204 denotes a configuration function changing unit that selectively enables and disables the communication parameter providing function. If the communication parameter providing function is enabled, communication parameters can be provided to another terminal by the communication parameter providing unit 203.

Reference numeral 205 denotes a providing function notification unit that notifies that the communication parameter providing function is enabled by adding device information to a beacon, probe response or the like.

Note that a beacon is an annunciation signal for annunciating various types of information related to a network, and is able to control fluctuations in transmission frequency due to changes in the transmission interval.

A probe response is a response signal to a probe request constituting a search signal, and terminal function information, network information and the like can be added thereto.

Reference numeral 206 denotes a network management unit that manages information related to terminals existing on a network to which the terminal 201 belongs, the number of terminals, and the like.

Reference numeral 207 denotes a terminal number comparison unit that compares whether the number of terminals participating in the network has exceeded a limit.

Reference numeral 208 denotes a providing function enabled timer unit. The configuration function changing unit 204 and the providing function notification unit 205 manage a time limit for which the communication parameter providing function is enabled, by managing the providing function enabled timer unit 208.

Reference numeral 209 denotes a communication parameter storage unit that performs reading and writing of provided communication parameters to the storage unit 103.

Reference numeral 210 denotes a configuration operation control unit that performs detection of operations by the configuration operation unit 106, and the like.

Reference numeral 211 denotes a display control unit that controls the content displayed on the display unit 105.

Reference numeral 212 denotes an activation notification reception unit that receives an activation notification signal showing that the communication parameter auto-configuration process is activated from another terminal in communication therewith.

Reference numeral 213 denotes an activation notification transmission unit that, in the case where the communication parameter auto-configuration process has been activated therein, transmits an activation notification signal showing that the process is activated to another terminal in communication therewith.

Reference numeral 214 denotes an activation notification encryption unit that encrypts activation notification signals when transmitted and decrypts activation notification signals when received.

Reference numeral 215 denotes a wireless processing unit that performs operations such as search, connect/disconnect, power save, communication rate configuration, channel configuration, and acquisition of information showing reception signal strength, constituting the basic functions of wireless communication.

The wireless processing unit 215 also controls the encryption/decryption of wireless packets encrypted using CCMP, TKIP or WEP constituting various communication encryption.

Note that all of the functional blocks are interrelated with software or hardware.

The above functional blocks are by way of example, with it being possible for a plurality of functional blocks to be constituted as a single functional block, and for any of the functional blocks to be further divided into blocks that perform a plurality of functions.

Figure 11:
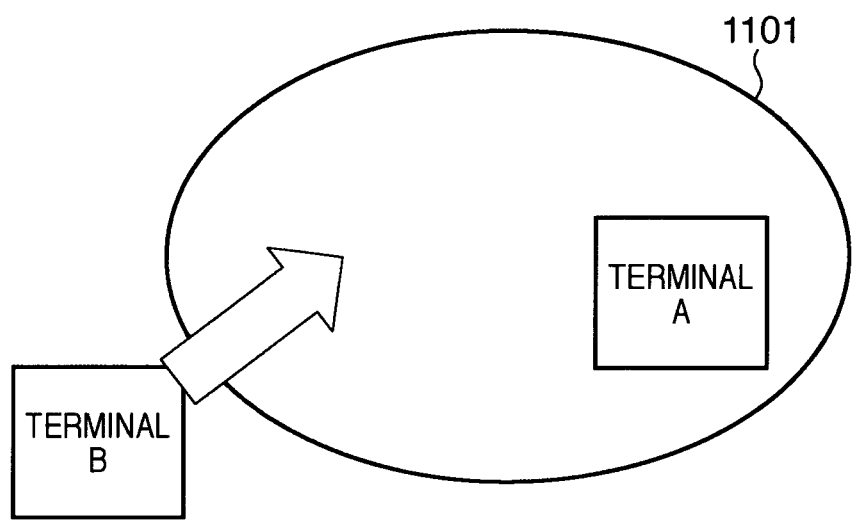
FIG. 11 is a network configuration diagram of the terminal A and the terminal B in the embodiment of the present invention.

FIG. 11 shows a terminal A, a terminal B and an ad-hoc network 1101 constituted by the terminal A.

Figure 12:
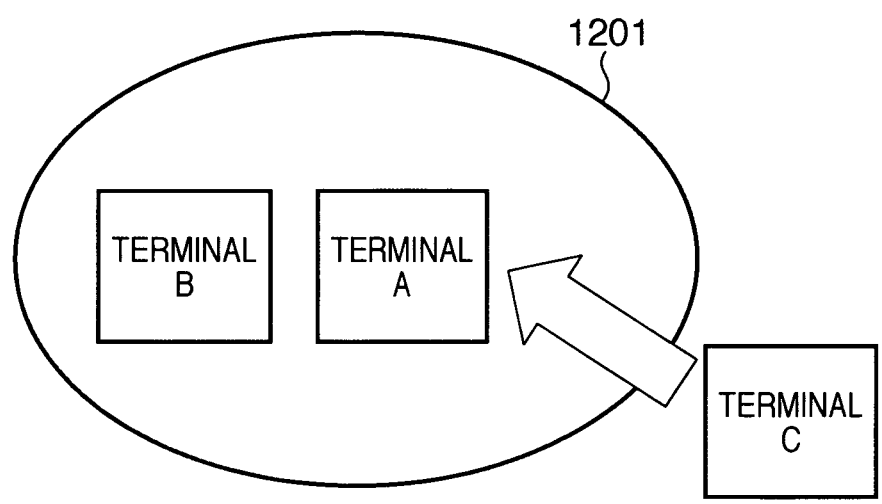
FIG. 12 is a network configuration diagram of the terminal A, the terminal B and the terminal C in the embodiment of the present invention.

Similarly, FIG. 12 shows a terminal A, a terminal B, a terminal C and an ad-hoc network 1201 constituted by the terminals A and B.

The terminals are provided with an IEEE 802.11 wireless LAN communication function, perform wireless communication using wireless LAN ad-hoc (hereinafter, ad-hoc) communication, and have the configurations of FIGS. 1 and 2 described above.

FIG. 11 shows a situation where the terminal B participates in the ad-hoc network constituted by the terminal A, and performs the communication parameter auto-configuration process.

Here, the terminals A and B operate respectively as a providing apparatus and a receiving apparatus, with communication parameters being provided from the terminal A to the terminal B.

FIG. 12 shows a situation where the network 1201 has been formed using the communication parameters after the communication parameter auto-configuration process between the terminals A and B is completed, and the terminal C newly participates in the network 1201 as a communication parameter receiving apparatus.

Figure 3:
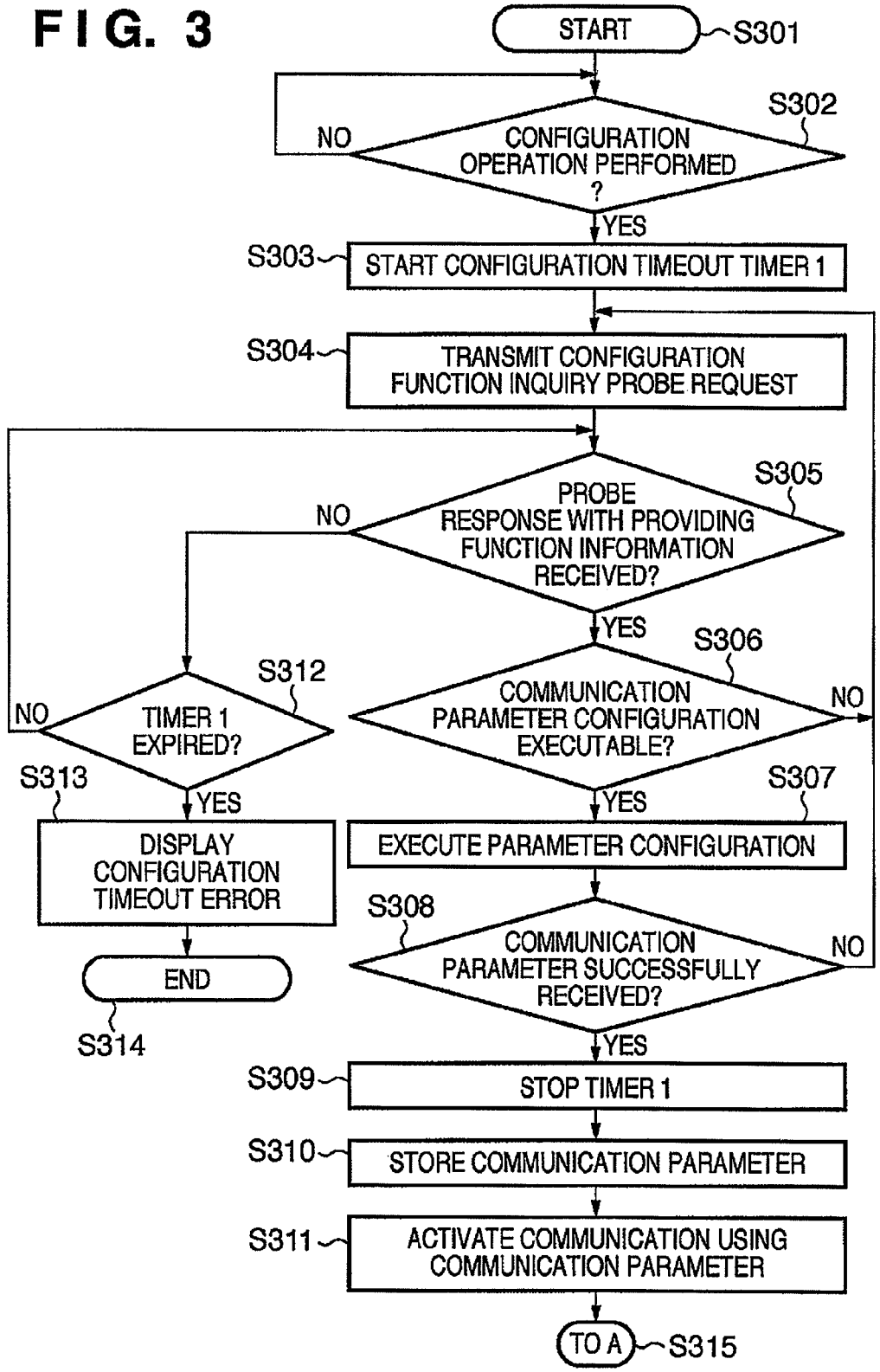
FIG. 3 is a flowchart representing an operation of a terminal B in the case where a communication parameter auto-configuration process is initially performed.

FIG. 3 is a flowchart showing an operation of the terminal B in the case where communication is performed with a configured communication parameter after the communication parameter auto-configuration process is initially performed between the terminals A and B.

The terminal B, after starting operation (S301), checks whether a configuration operation for giving the instruction to start the communication parameter auto-configuration process such as the press of a button has been performed (S302). If a configuration operation has been performed, the terminal B starts a timer 1 set to a time period at which the communication parameter auto-configuration process times out (S303).

Subsequently, the terminal B transmits a probe request to which has been added information for requesting the communication parameter auto-configuration process, in order to search for a communication parameter providing apparatus (S304). Note that the probe request corresponds to the providing function inquiry probe request in S304. Then, the terminal B waits for a probe response to which has been added information showing that the opposing apparatus has a providing function in the communication parameter auto-configuration to be returned (S305).

If the probe response is not received before the timer 1 expires (S312:Yes), the terminal B performs a configuration timeout error display (S313), and executes termination processing (S314).

If the probe response is received before the timer 1 expires (S305:Yes), the terminal B checks the additional information included in the received probe response, and investigates whether communication parameter auto-configuration is executable (S306).

If not executable (S306:No), the terminal B transmits a probe request again in order to search for a terminal in which the communication parameter providing function is enabled (S304).

If communication parameter auto-configuration is executable, the terminal B executes the communication parameter auto-configuration process (S307). If a communication parameter is successfully received (S308:Yes), the terminal B stops the timer 1 (S309), and stores the received communication parameter (S310). The terminal B then activates wireless communication that uses the received communication parameter (S311). A communication parameter in common with the terminal A is thus configured in the terminal B, and the ad-hoc network 1201 shown in FIG. 12 is formed.

Figure 5A:
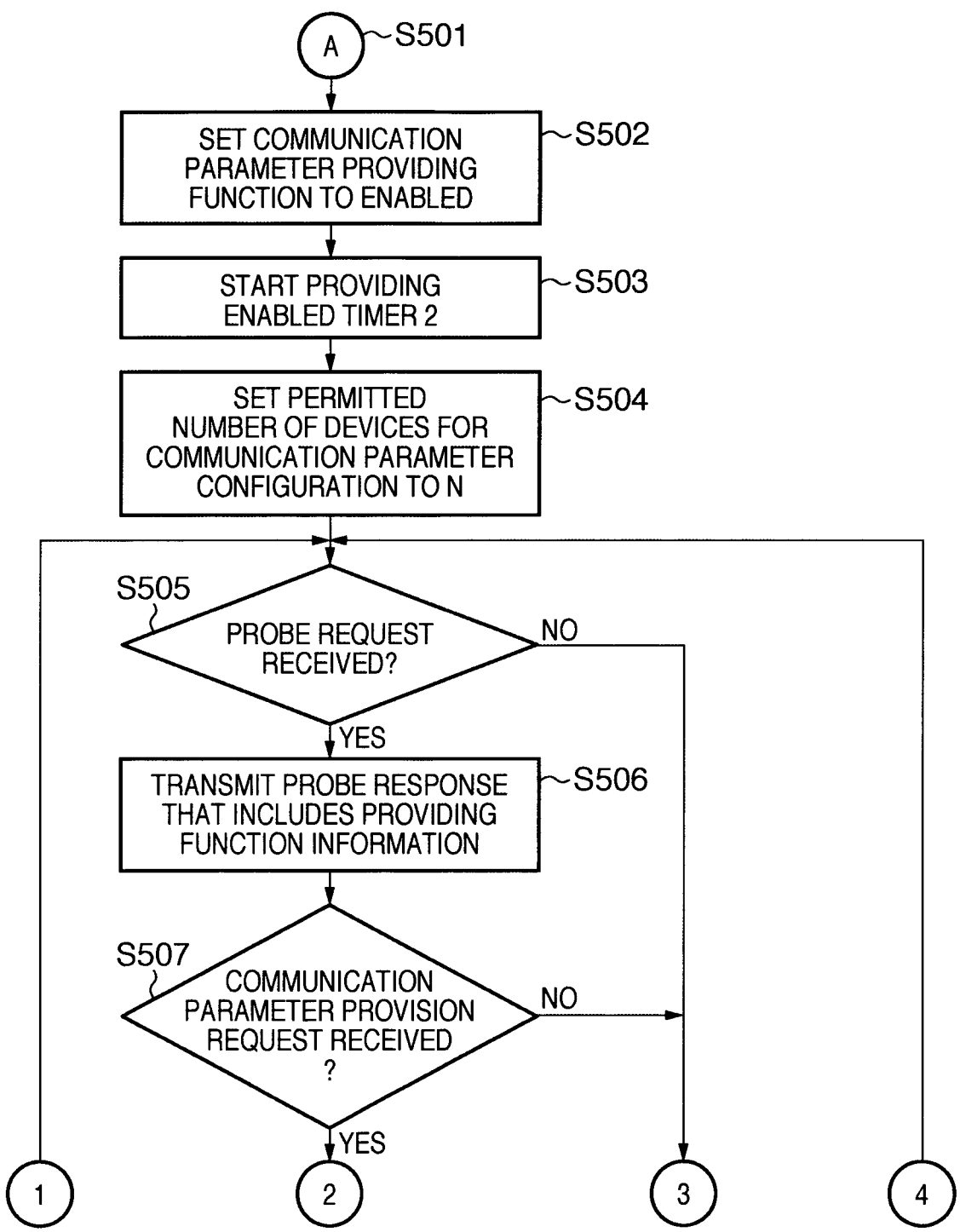
FIGS. 5A and 5B are flowcharts representing an operation of the terminal B in the case where a communication parameter providing function is enabled.

Then, proceeding to FIG. 5A, the terminal B enables the communication parameter providing function, and provides a communication parameter to the terminal C seeking to participate in the ad-hoc network 1201 (S315).

Figure 5B:
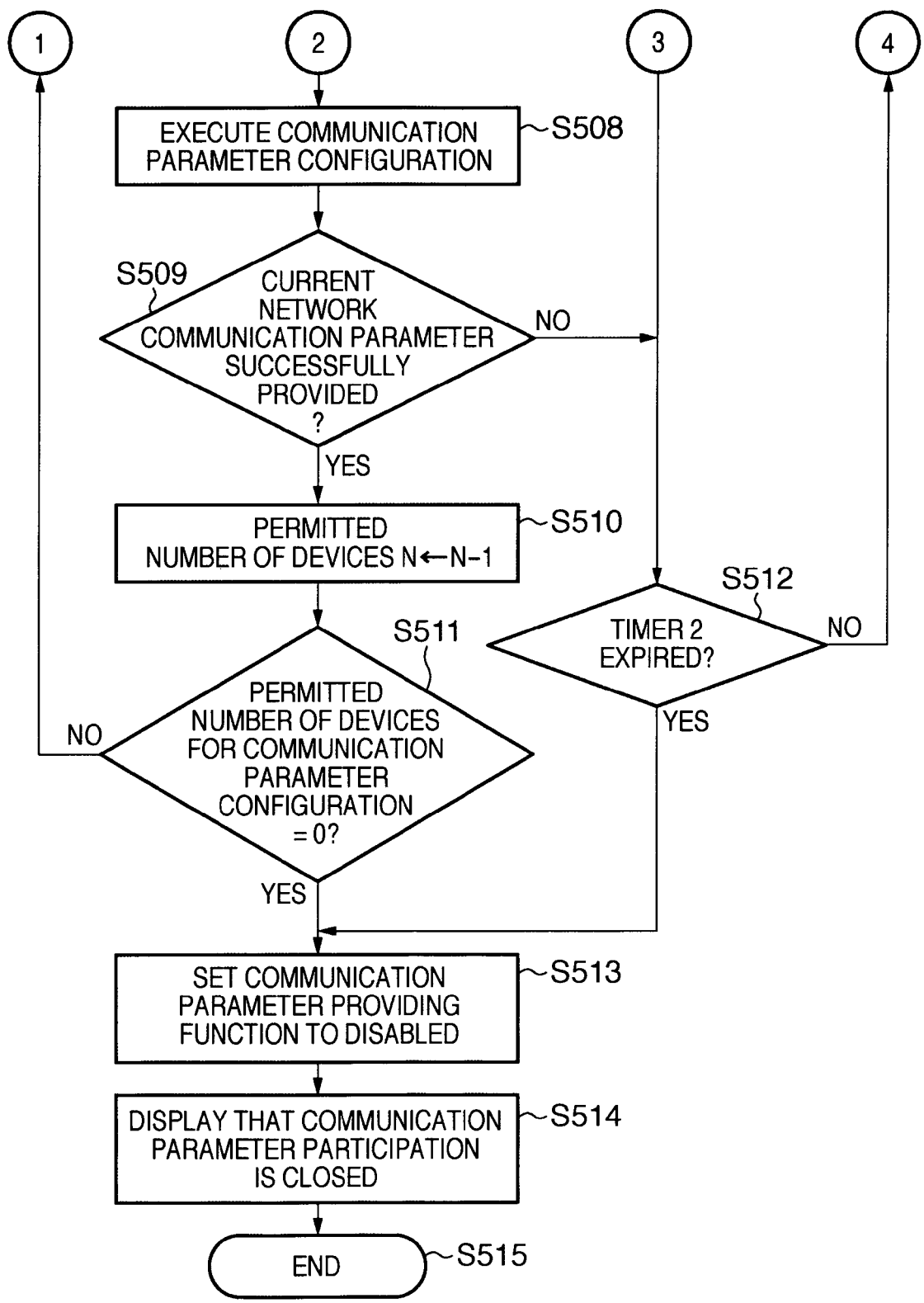

Hereinafter, the flowcharts of FIGS. 5A and 5B will be described. Here, an operation of the terminal B in the case where the communication parameter auto-configuration process has been activated by a button being pressed in the terminal C will be described.

After starting the processing (S501), firstly the terminal B sets the function of the communication parameter providing unit to enabled (S502). Subsequently, the terminal B activates a timer 2 set to the time period for which the providing function is enabled (S503). Further, the terminal B sets a permitted number of devices N showing the maximum number of terminals that can participate in the ad-hoc network 1201 (maximum number of terminals permitted to perform communication parameter configuration) (S504). If the permitted number of devices N is set to a value greater than 1, that means that the communication parameter auto-configuration process of a plurality of terminals can be performed by a single configuration operation (button press). Note that the permitted number of devices N can be determined by the user using the configuration operation unit 106, or may be stored in advance in the storage unit 103.

Next, the terminal B checks whether there has been receipt of a probe request constituting a search signal (S505). If a probe request has been received, the terminal B transmits a probe response to which has been added information showing that the communication parameter providing function is enabled (S506). Note that at this point, the providing function has been set to enabled in both the terminals A and B. Therefore, either the terminal A or B returns a probe response to which has been added information showing that the communication parameter providing function is enabled, in response to the probe request from the terminal C. As a result, the terminal C is assured of being able to locate a communication parameter providing apparatus.

Next, when a communication parameter provision request is received (S507), the terminal B executes the communication parameter auto-configuration process (S508). Here, the terminal B, operating as a communication parameter providing apparatus, provides a communication parameter to the terminal C constituting the receiving apparatus. If a communication parameter is successfully provided (S509:Yes), the terminal B updates the permitted number of devices N to N−1 by subtracting 1 therefrom (S510).

Here, while not shown on the flowchart, the terminal B can easily notify the updated permitted number of devices to other providing apparatuses on the same network (here, terminal A). For example, the number of terminals currently permitted to participate in the network can be notified by using a beacon, a probe request/response, an EAP packet (protocol located at OSI layer 2) or the like.

Next, if the permitted number of devices N is not 0 (zero) (S511:No), the terminal B continues to execute new terminal registration.

If the permitted number of devices N is 0 (S511:Yes) or if the timer 2 showing the enabled time period of the providing function has expired (S512:Yes), the terminal B sets the communication parameter providing function to disabled (S513). Further, the terminal B displays a message that additional participants to the network will no longer be accepted, and notifies the user that the new registration process is completed (S514). Then, the terminal B performs termination processing (S515).

Here, while not shown on the flowchart, the terminal B can notify the fact that the communication parameter providing unit has been disabled to other providing apparatuses on the same network (here, terminal A). For example, notification can be performed by using a beacon, a probe request/response, an EAP packet or the like.

Up to this point, the case where provision of a communication parameter to the terminal C seeking to participate in the network is performed after the communication parameter auto-configuration process is executed between the terminals A and B has been described, although the processing of FIGS. 3 and 5 need not necessarily be performed in succession.

Figure 4:
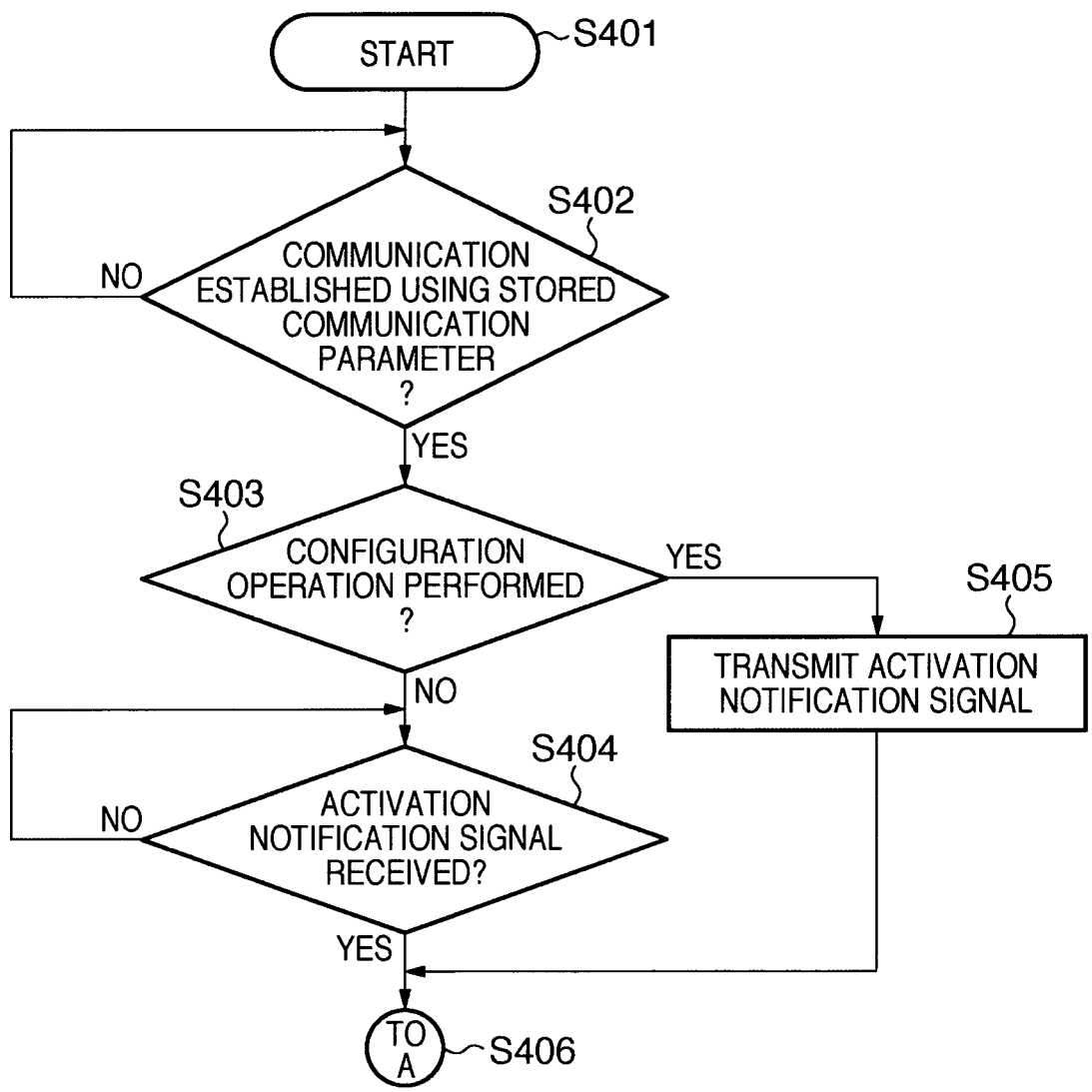
FIG. 4 is a flowchart representing an operation of the terminal B in the case where a configuration operation is performed in the terminal B after the communication parameter auto-configuration process is completed.

Next, processing will be described in the case where additional configuration of a communication parameter in the terminal C is performed as a result of a configuration operation being performed by the user in the terminal A or B, after the communication parameter auto-configuration process is completed between the terminals A and B. FIG. 4 is a flowchart showing an operation of the terminal B in this case.

After starting the processing (S401), firstly the terminal B establishes wireless communication using the communication parameter previously received as a result of the communication parameter configuration process (S402). Here, if a configuration operation for instructing the start of the communication parameter auto-configuration process is performed in the terminal B, in order to accept the participation of the terminal C in the network (S403), the terminal B transmits an activation notification signal to the terminal A in communication therewith (S405). As aforementioned, an activation notification signal is a signal showing that the communication parameter auto-configuration process is activated.

Even if a configuration operation has not been performed in the terminal B, when a configuration operation is performed in the terminal A, the terminal B receives an activation notification signal transmitted by the terminal A (S404). Here, the activation notification signal is transmitted using a beacon, a probe request/response, an EAP packet or the like. Note that in the case where an activation notification signal is transmitted, it is necessary from a security standpoint to protect against spoofing, replay attacks, sniffing and the like. In view of this, the activation notification signal desirably is transmitted after being encrypted using a technique for encrypting management frames (proposed with IEEE 802.11w), for example.

After transmitting an activation notification signal (S405) or after receiving an activation notification signal (S404), the terminal B proceeds to FIG. 5A and performs the aforementioned processing (S406).

Note that while the processing of FIG. 4 was described in the above description as being performed instead of the processing of FIGS. 3 and 5 in succession, the processing of FIG. 4 may be performed after the processing of FIGS. 3 and 5. That is, the terminal B enables the communication parameter providing function after initially executing the communication parameter auto-configuration process with the terminal A, and provides communication parameters to terminals seeking to participate in the network for a fixed period, before then disabling the providing function after the fixed period has elapsed. Then, if a configuration operation for instructing the start of the communication parameter auto-configuration process is again performed in the terminal B or A, the terminal B enables the communication parameter providing function, and provides communication parameters to terminals seeking to participate in the network for a fixed period. Note that if the number of terminals participating in the network has already reached the permitted number of devices in the case where the configuration operation is performed, the providing function need not be enabled.

FIGS. 6 to 8 show exemplary processing in the case where an authentication process using a password is performed in order to improve security in the communication parameter auto-configuration process. The processing of FIGS. 6 to 8 is performed by the terminal B instead of the processing of FIGS. 5A and 5B, in the case where a probe request to which has been added information for requesting the communication parameter auto-configuration process following the authentication process using a password is received.

Figure 6A:
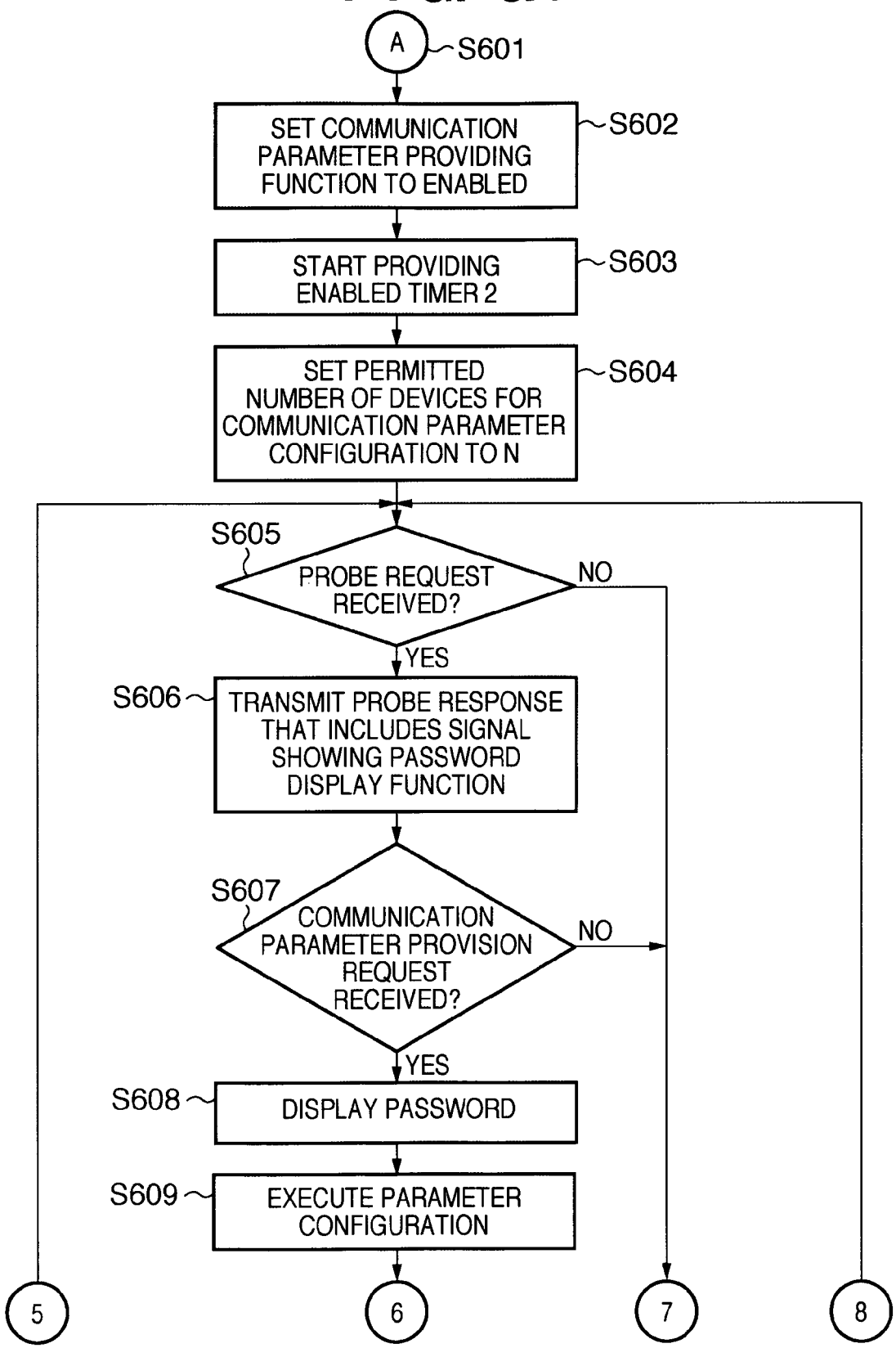
FIGS. 6A and 6B are flowcharts representing an operation of the terminal B in the case where the terminal B does not have a password entry function.
Figure 6B:
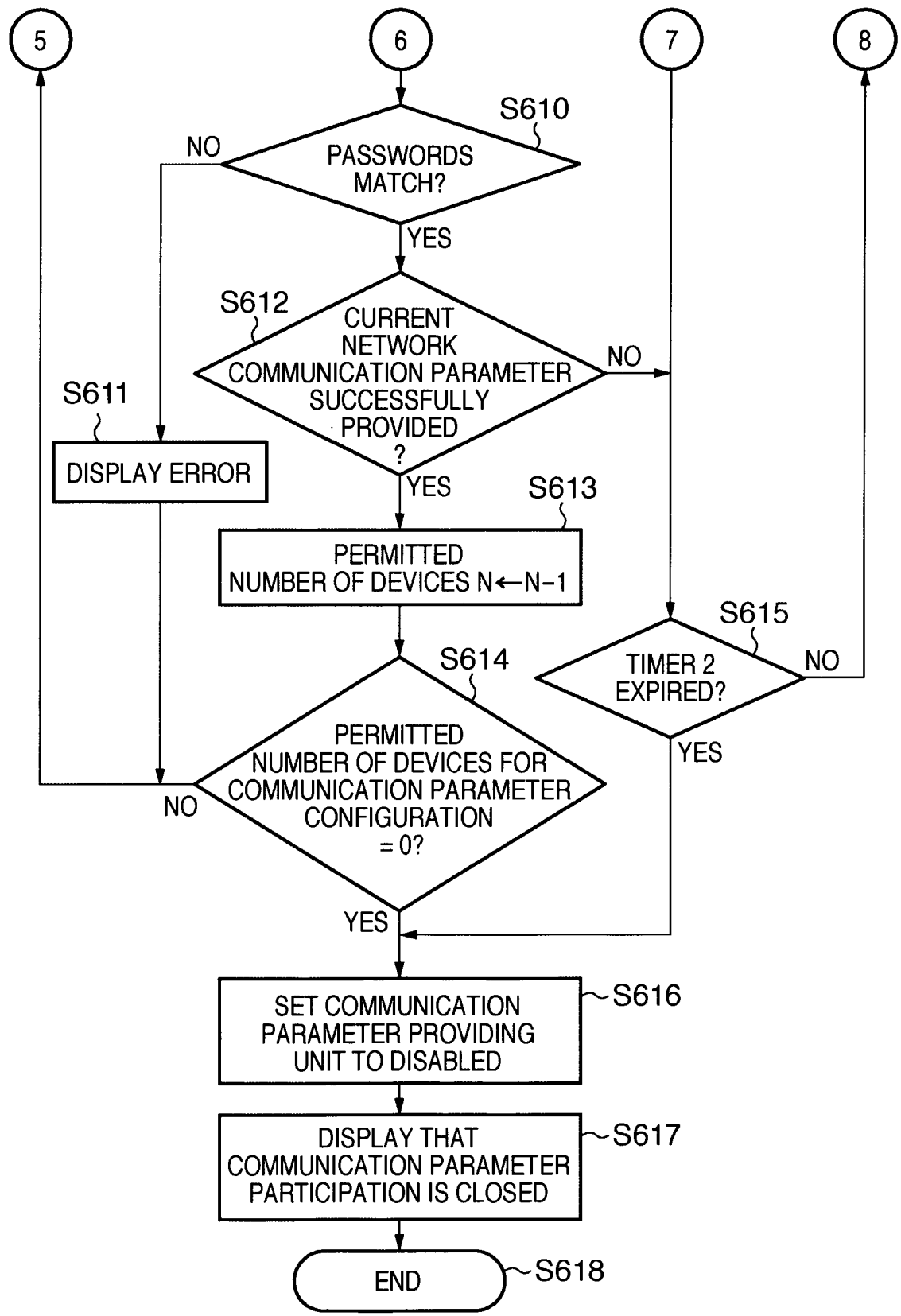

FIGS. 6A and 6B are flowcharts of the terminal B when a password is displayed on the display unit and the value thereof is entered on the opposing terminal side, in the case where the terminal B does not have a password entry function.

Note that since the processing of S601 to S604 in FIG. 6A is similar to the processing of S501 to S504 in FIG. 5A, description thereof will be omitted here.

When a probe request is received (S605), the terminal B, in response, transmits a probe response that includes information showing that the terminal B has a password display function, together with information showing that the providing function is enabled (S606).

Then, the terminal B waits for receipt of a communication parameter provision request from the opposing terminal (here, terminal C) (S607), displays a password on the display unit when the request is received (S608), and executes the communication parameter auto-configuration process (S609). Here, once the user on the terminal C side has entered the password displayed on the display unit of the terminal B to the terminal C, the hash value of the entered password is transmitted to the terminal B. The terminal B determines whether the transmitted hash value of the password matches the hash value of the password displayed thereby (S610).

If not matched, the terminal B performs error display (S611), and returns to S605. Note that the terminal B may be configured to terminate the communication parameter auto-configuration process after performing error display. If matched, the terminal B proceeds to S612. Since the processing of S612 to S618 is similar to the processing of S509 to S515 in FIG. 5B, description thereof will be omitted here.

Note that while the above description relates to a case in which a probe response that includes information showing that the terminal B has a password display function is transmitted in the case where the terminal B does not have a password entry function, information showing that the terminal B does not have a password entry function may be included and transmitted instead. In that case, the terminal C, on receiving a probe response that includes this information, determines that the password will be entered thereat.

In the case where the terminal B does not have a password entry function, the terminal B may be configured to not add information showing that the communication parameter providing function is enabled to the probe response. This enables the terminal B to switch whether to provide communication parameters, according to whether the terminal B has an entry function, in the case where the communication parameter auto-configuration process following the authentication process is requested.

Figure 7A:
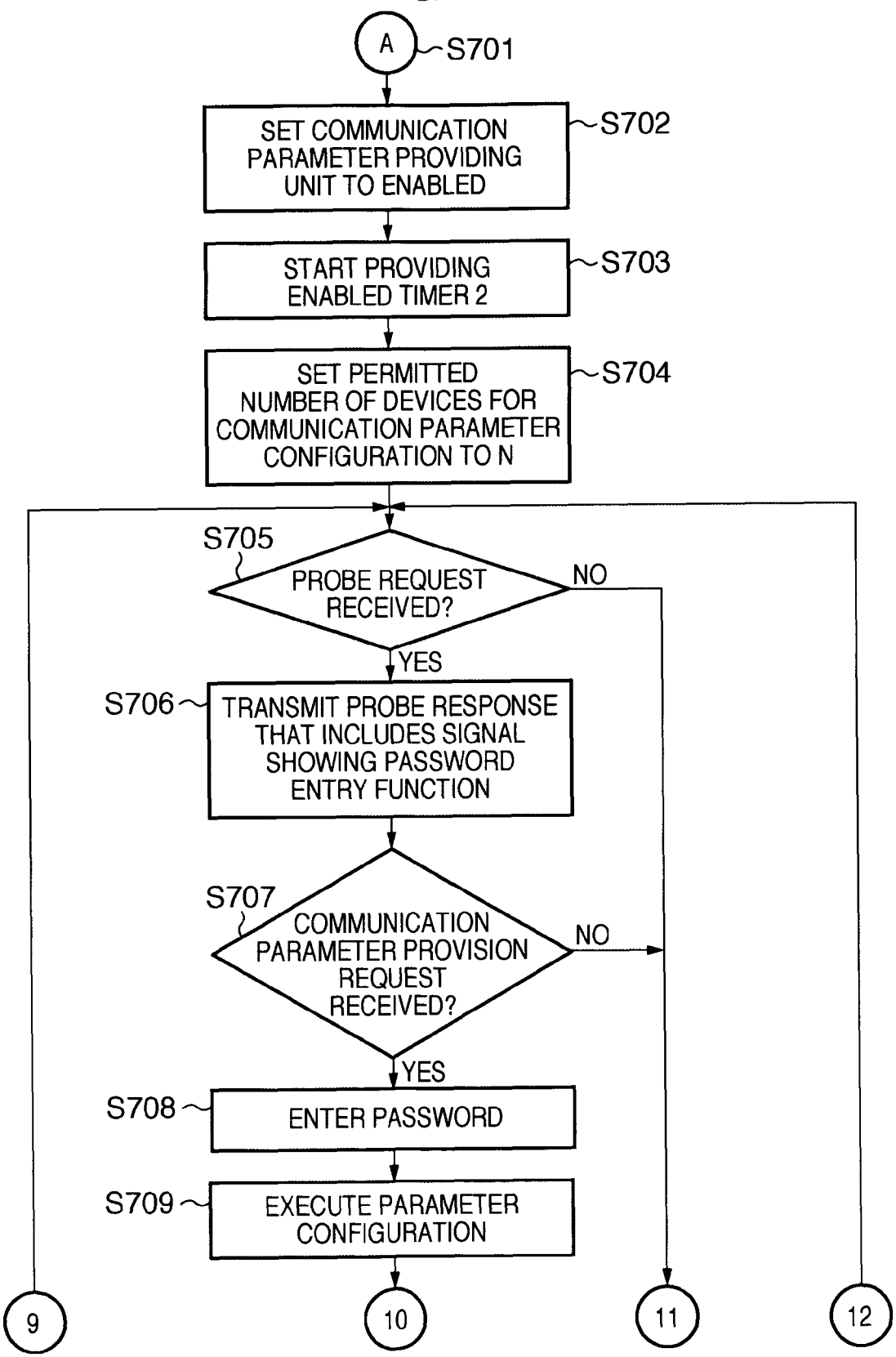
FIGS. 7A and 7B are flowcharts representing an operation of the terminal B in the case where the terminal B has a password entry function.
Figure 7B:
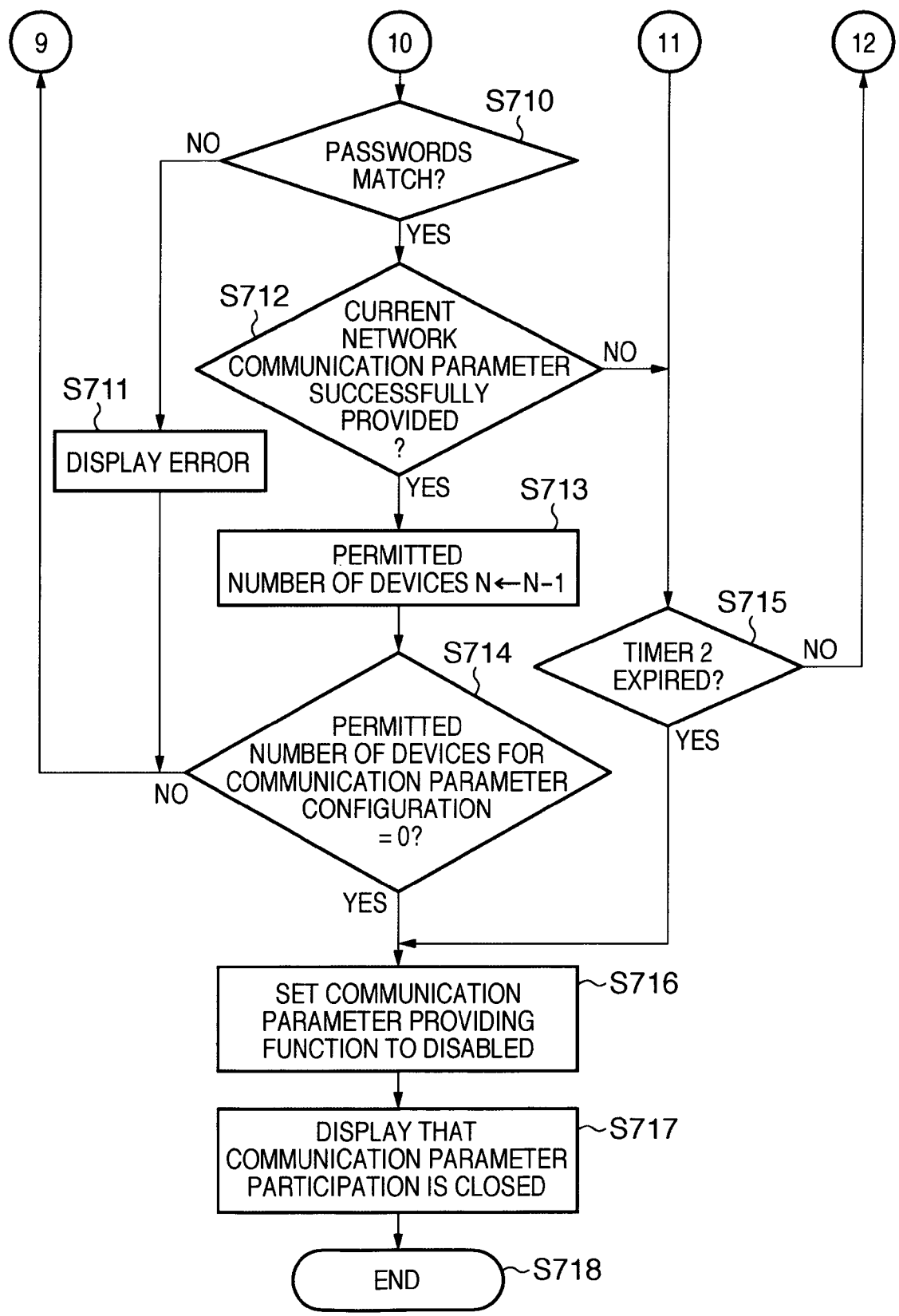

FIGS. 7A and 7B are flowcharts of the terminal B when a password is entered on the terminal B side, in the case where the terminal B has a password entry function.

Note that since the processing of S701 to S704 in FIG. 7A is similar to the processing of S501 to S504 in FIG. 5A, description thereof will be omitted here.

When a probe request is received (S705), the terminal B, in response, transmits a probe response that includes information showing that the terminal B has a password input function, together with information showing that the providing function is enabled (S706).

Then, the terminal B waits for receipt of a communication parameter provision request from the opposing terminal (here, terminal C) (S707), and when the request is received, instructs the user to enter a password (S708). Note that the user on the terminal B side enters the same value as the password displayed on the display unit of the terminal C to the terminal B.

Next, the terminal B executes the communication parameter auto-configuration process (S709). Here, the hash value of the password displayed on the terminal C side is transmitted to the terminal B, and the terminal B determines whether the transmitted hash value of the password matches the hash value of the password entered therein (S710).

If not matched, the terminal B performs error display (S711), and returns to S705. Note that the terminal B may be configured to terminate the communication parameter auto-configuration process after performing error display. If matched, the terminal B proceeds to S712. Since the processing of S712 to S718 is similar to the processing of S509 to S515 in FIG. 5B, description thereof will be omitted here.

Figure 8A:
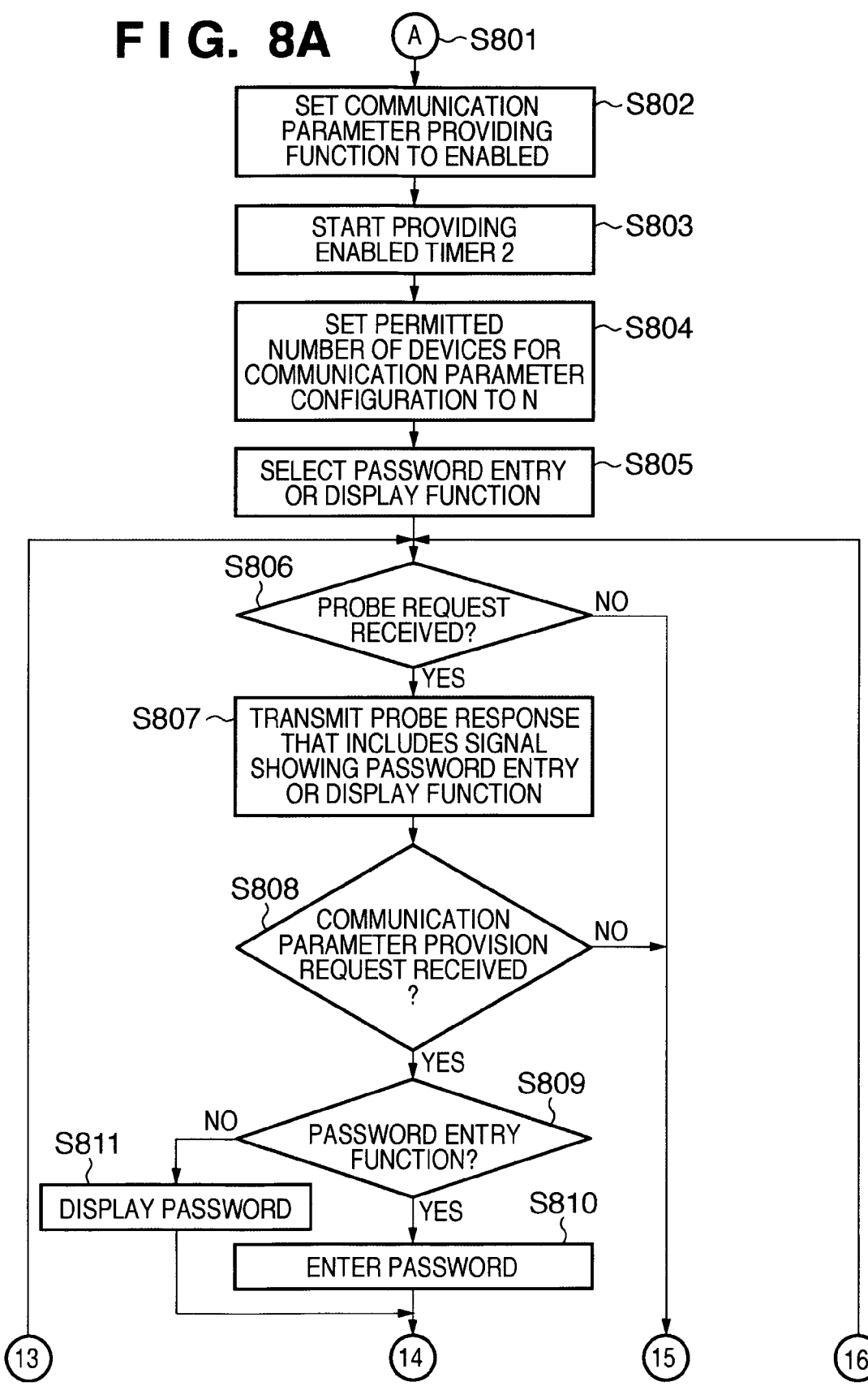
FIGS. 8A and 8B are flowcharts representing an operation of the terminal B in the case where password entry or display is selected.
Figure 8B:
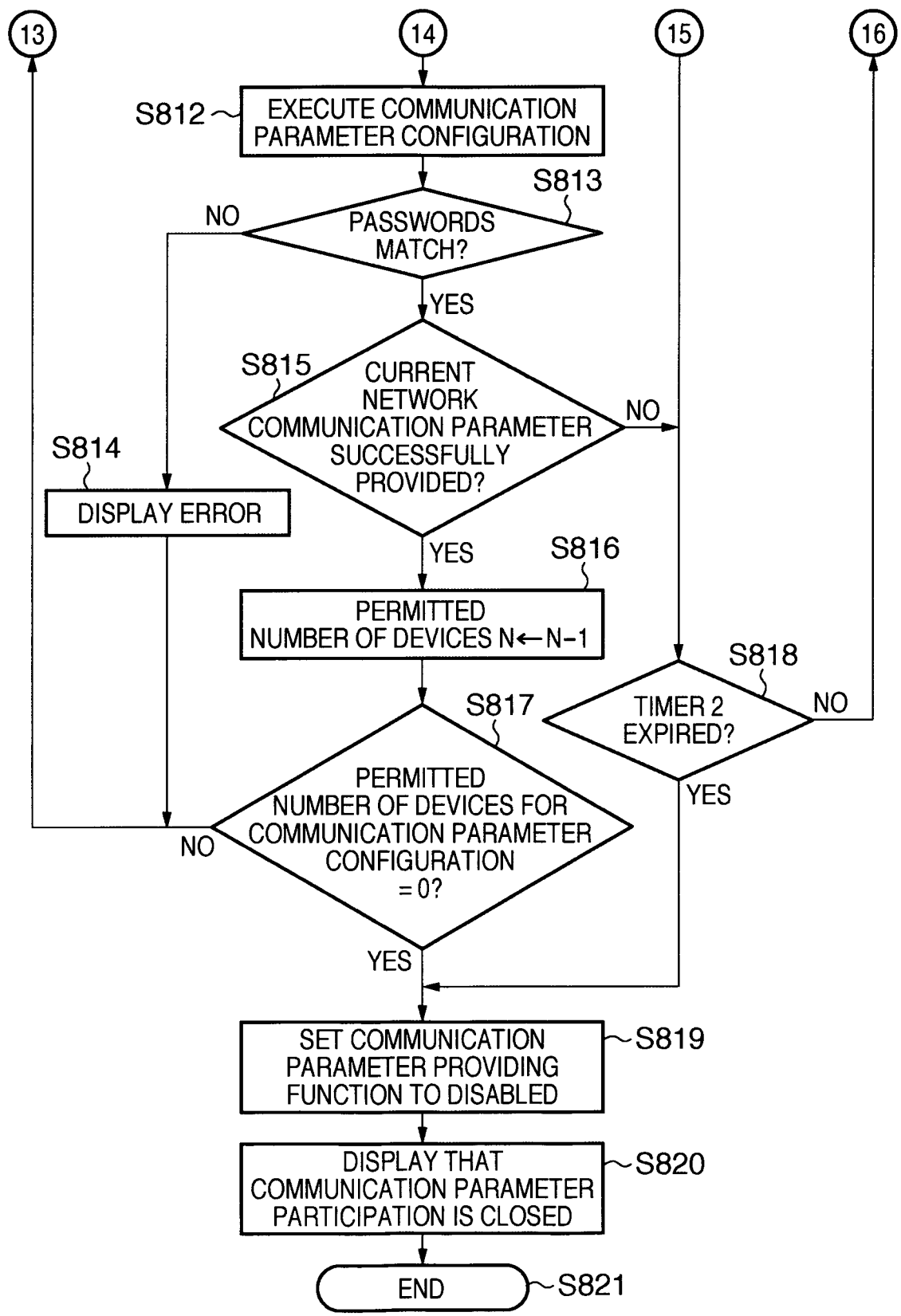

FIGS. 8A and 8B are flowcharts of the terminal B when selecting whether to perform password display or entry on the terminal B side.

Note that since the processing of S801 to S804 in FIG. 8A is similar to the processing of S501 to S504 in FIG. 5A, description thereof will be omitted here.

The terminal B instructs the user to select whether to perform password entry or display, and receives a selection operation by the user (S805).

On receipt of a probe request (S806), the terminal B returns a probe response that includes information showing the password entry or display function, together with information showing that the providing function is enabled, according to the selection result in S805 (S807). The terminal B then determines whether a communication parameter provision request has been received (S808), and proceeds to step S809 if a request has been received (S808:Yes) and to step S818 if a request has not been received (S808:No).

Then, once a communication parameter provision request has been received (S805), the terminal B, if password entry was selected in S805 (S809:Yes), instructs the user to enter a password (S810). If password display was selected in S805, the terminal B displays a password (S811). The terminal B executes the communication parameter auto-configuration process, after password entry or display has been performed (S812). Here, the terminal B determines whether the hash value of the password transmitted from the opposing terminal (here, terminal C) matches the hash value of the password entered or displayed on the terminal B side (S813).

If not matched, the terminal B performs error display (S814), and returns to S806. Note that the terminal B may be configured to terminate the communication parameter auto-configuration process after performing error display. If matched, the terminal B proceeds to S815. Since the processing of S815 to S821 is similar to the processing of S509 to S515 in FIG. 5B, description thereof will be omitted here.

Note that the above description relates to the user being allowed to select whether to enter or display a password in S805, although configuration information indicating which to select may be stored in advance in the storage unit 103 of the terminal B. Alternatively, priorities for entry and display may be stored in advance. For example, terminals with a password entry function may be allowed to select entry, while only terminals without a password entry function may be allowed to select display.

According to FIGS. 6 to 8, on receiving a probe request, a terminal in which the providing function is enabled thus returns a probe response to which has been added information showing that a role in the authentication process, together with information showing that the providing function is enabled.

FIG. 9 is a sequence diagram showing controls up until when configuration of a communication parameter in the terminal C is performed, after the communication parameter auto-configuration process is executed between the terminals A and B.

At the initial stage, the terminals A, B and C are in an unconfigured state in which a communication parameter has yet to be configured (F901, F902, F903).

Firstly, when a configuration start operation for instructing the start of the communication parameter auto-configuration process is performed in the terminal A (F904), the terminal A, operating as a providing apparatus, starts transmission of a beacon to which has been added information showing that communication parameter auto-configuration is available (F905).

Next, when a configuration start operation is also similarly performed in the terminal B (F906), the terminal B transmits a probe request to which has been added information for requesting the communication parameter auto-configuration process, in order to search for a communication parameter providing apparatus (F907).

On receiving the probe request, the terminal A, operating as a providing apparatus, returns a probe response to which has been added information showing that the providing function is enabled (F908).

The terminal B locates the terminal A as a result of receiving the probe response, and receives a communication parameter from the terminal A (F909). The terminals A and B change to a configured state indicating that a communication parameter has been configured (F910, F911), after a communication parameter has been successfully provided and received.

Subsequently, the terminal B changes the communication parameter providing function therein to enabled (F912). The terminal A starts transmission of a beacon (F913), and the terminal B also similarly starts transmission of a beacon (F914). Here, as mentioned previously, in an IBSS/ad-hoc network compliant with IEEE 802.11, the terminal that last transmitted a beacon is stipulated to return a probe response constituting a response to a probe request.

Here, when a configuration start operation is performed in the terminal C (F915), the terminal C transmits a probe request to which has been added information for requesting the communication parameter auto-configuration process, in order to search for a terminal in which the providing function is enabled (F916). Here, as a result of the aforementioned stipulation, the terminal B which last transmitted a beacon returns a probe response to which has been added information showing that the providing function is enabled (F917).

The terminal C locates the providing apparatus B as a result of receiving the probe response, and receives a communication parameter from the terminal B (F918).

The terminal C also changes to a configured state indicating that a communication parameter has been configured, after a communication parameter has been successfully provided and received (F919). Similarly, the terminal C changes the communication parameter providing function therein to enabled (F920).

Wireless communication between the terminals A, B and C thereby becomes possible (F921).

FIG. 10 is a sequence showing controls up until when configuration of a communication parameter in the terminal C is performed as an additional configuration during wireless communication, after the communication parameter auto-configuration process is executed between the terminals A and B.

The terminals A and B are in a configured state in which a communication parameter has been already configured, and the terminal C is in an unconfigured state in which a communication parameter has yet to be configured (F1001, F1002, F1003).

The terminals A and B have already started wireless communication using the configured communication parameter (F1004).

Here, a configuration start operation for instructing start of the communication parameter auto-configuration process is performed in the terminal A in order to allow the terminal C to participate in the network (F1005). The terminal A, operating as a providing apparatus, starts transmission of a beacon to which has been added information showing that communication parameter auto-configuration is available (F1006). The terminal A then changes the communication parameter providing function therein to enabled (F1007).

At this point, the terminal B is transmitting a beacon to which has not been added information showing that communication parameter auto-configuration is available (F1008). The terminal A transmits an activation notification signal to the terminal B, in order to notify the terminal B that the communication parameter auto-configuration process is activated (F1009). Here, a probe request that includes information showing that the communication parameter auto-configuration process has been activated is encrypted and transmitted, using a management frame encryption function (proposed with IEEE 802.11w) (F1009).

The terminal B, having received the probe request, encrypts and returns a probe response to which has been added information showing that the providing function is enabled, after having decrypted the encrypted information and confirmed the content (F1010). The terminal B also changes the communication parameter providing function to enabled (F1011). Subsequently, the terminal B starts operating as a providing apparatus, and starts transmission of a beacon to which has been added additional information showing that communication parameter auto-configuration is available (F1012).

Next, a configuration start operation is performed in the terminal C in order to participate in the same network as the terminals A and B (F1013). The terminal C transmits a probe request to which has been added information for requesting the communication parameter auto-configuration process, in order to search for a providing apparatus (F1014).

Here also, the terminal B, having last transmitted a beacon, returns a probe response to which has been added information showing that the providing function is enabled, based on the stipulation of the IBSS/ad-hoc network compliant with IEEE 802.11 (F1015).

Then, the communication parameter currently being used in communication between the terminals A and B is provided to the terminal C by the terminal B (F1016), and the terminal C also changes to a configured state showing that a communication parameter has been configured (F1017). Note that in the case where a plurality of communication parameters are stored, the terminal B provides the communication parameter being used in wireless communication when the communication parameter provision request is received.

Wireless communication thus becomes possible between the terminals A, B and C (F1018).

In the present embodiment, activation of the communication parameter auto-configuration process is notified by the terminal A to the terminal B using an encrypted probe request, when the configuration start operation is performed in the terminal A. However, an OSI layer 2 protocol such as an encrypted EAP packet or an OSI layer 3 protocol such as an encrypted IP packet may be used.

According to the present embodiment, the terminal B enables the communication parameter providing function after receiving a communication parameter as a receiving apparatus. As a result, either the terminal A or B returns a probe response showing that the providing function is enabled, if a probe request for searching for a providing apparatus is transmitted. Consequently, the terminal C is able to easily and quickly detect a providing apparatus and receive communication parameters.

Also, security can be improved, since the terminal B disables the providing function after a fixed period has elapsed from when the providing function was enabled, or once the number of terminals to which a communication parameter has been provided reaches a fixed number.

If there is a terminal seeking to newly participate in the network, the communication parameter providing function can be enabled in both the terminals A and B as a result of a configuration operation being performed in either the terminal A or B, and a communication parameter can be provided.

As described above, the present embodiment enables a new apparatus that requests communication parameter configuration to easily and reliably detect communication parameter providing apparatus. Consequently, the communication parameter auto-configuration process can be easily performed, even in the case where an ad-hoc network is formed with a plurality of communication apparatuses.

While a preferred embodiment of the present invention has been described above, this is an example for illustrating the present invention, and the scope of the present invention is not intended to be limited to only this practical example. The present embodiment can be variously modified in a range that does not depart from the gist of the present invention.

For example, while a probe request and a probe response are used in the description of the above embodiment, this does not limit the type of signal transmitted, with any signal being applicable provided a similar role can be performed.

The above description relates to an exemplary wireless LAN compliant with IEEE 802.11. However, the present invention may be implemented in another wireless medium such as a wireless USB, MBOA, Bluetooth (registered trademark), UWB or ZigBee. The present invention may also be implemented in the wired communication medium of a wired LAN or the like.

Here, MBOA stands for MultiBand OFDM Alliance. Also, UWB includes wireless USB, wireless 1394 and WINET, for example.

While a network identifier, encryption method, encryption key, authentication method and authentication key were given as exemplary communication parameters, needless to say, other information may be employed or other information may also be included as a communication parameter.

The present invention may be configured such that a recording medium with a computer program of software for realizing the foregoing functions is supplied to a system or an apparatus, and program code stored in the recording medium is read out and executed by a computer (CPU, MPU) in the system or apparatus. In this case, the actual computer program read out from the storage medium realizes the functions of the forgoing embodiment, and the storage medium storing the computer program constitutes the present invention.

Storage media that can be used for supplying the computer program include, for example, flexible disk, hard disk, optical disk, magneto-optical disk, CD-ROM, CD-R, magnetic tape, nonvolatile memory card, ROM, and DVD.

The foregoing functions, not only being realized as a result of a computer executing the read computer program, may also be realized as a result of an OS running on a computer performing part or all of the actual processing based on instructions in the program code. OS stands for operating system.

Further, the foregoing functions may also be realized as a result of the computer program read out from the storage medium being written to a memory provided in a function expansion board inserted into a computer or a function expansion unit connected to a computer, and a CPU provided in the function expansion board or the function expansion unit then performing part or all of the actual processing based on instructions in the program code.

As described above, the present invention enables a providing apparatus that provides communication parameters to be easily and quickly settled on.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-200907, filed on Aug. 1, 2007, which is hereby incorporated by reference herein in its entirety.

The invention claimed is:

1. A communication apparatus, comprising:
a configuration unit constructed to perform a communication parameter configuration process as one of a communication parameter providing apparatus and a communication parameter receiving apparatus;
a detection unit constructed to detect that the communication parameter configuration process for sharing communication parameters with another communication apparatus is instructed by a user operation;
a receiving unit constructed to receive a search signal for searching for a communication parameter providing apparatus;
a selection unit constructed to select whether to input or to display information for use in an authentication process, and
a response unit constructed to add information to a response to the search signal and to send the response, in a case that the user operation for the communication parameter configuration process is detected by the detection unit and the search signal is received by the receiving unit while the communication apparatus participates in a network using communication parameters that the communication apparatus received from another communication apparatus, as the communication parameter receiving apparatus,
wherein, using the information, an apparatus receiving the response identifies the communication apparatus as a communication parameter providing apparatus, and
wherein the response unit changes information to be added to the response according to the selection by the selection unit.

2. The communication apparatus according to claim 1, further comprising a transmission unit constructed to transmit a signal indicating that the communication parameter configuration process is activated, in a case that the user operation for the communication parameter configuration process is detected by the detection unit while the communication apparatus participates in a network using communication parameters that the communication apparatus received from another communication apparatus, as the communication parameter receiving apparatus.

3. The communication apparatus according to claim 1, wherein the response unit adds information, which indicates that the communication apparatus has a function for inputting information for use in an authentication process, to the response if the communication apparatus has a function for inputting information for use in the authentication process.

4. The communication apparatus according to claim 1, wherein the response unit adds information, used by an apparatus receiving a response to the search signal to identify the communication apparatus as a communication parameter providing apparatus, to the response and to send the response, in a case that a signal indicating that the communication parameter configuration process is activated is received and the search signal is received by the receiving unit while the communication apparatus participates a network using communication parameters that the communication apparatus received from another communication apparatus, as the communication parameter receiving apparatus.

5. The communication apparatus according to claim 1, wherein, in case that the communication apparatus provides, as the communication parameter providing apparatus, communication parameters to a second communication apparatus while the communication apparatus participates in a network using communication parameters that the communication apparatus received from a first communication apparatus as the communication parameter receiving apparatus, the communication apparatus provides communication parameters for participating in the network to the second communication apparatus.

6. The communication apparatus according to claim 1, wherein the communication parameters comprises at least one of a network identifier, an encryption method, an encryption key, an authentication method or an authentication key.

7. The communication apparatus according to claim 1, wherein the communication apparatus performs wireless communication compliant with IEEE 802.11 series wireless LAN.

8. A control method of a communication apparatus for performing a communication parameter configuration process as one of a communication parameter providing apparatus and a communication parameter receiving apparatus, comprising the steps of:

detecting that the communication parameter configuration process for sharing communication parameters with another communication apparatus is instructed by a user operation;

receiving a search signal for searching for a communication parameter providing apparatus;

selecting whether to input or to display information for use in an authentication process, and adding information to a response to the search signal and to send the response, in a case that the user operation for the communication parameter configuration process is detected and the search signal is received while the communication apparatus participates a network using communication parameters that the communication apparatus received from another communication apparatus, as the communication parameter receiving apparatus, wherein, using the information, an apparatus receiving the response identifies the communication apparatus as a communication parameter providing apparatus, and wherein information to be added to the response is changed according to the selection of whether to input or to display information for use in an authentication process.

* * * * *